(12) United States Patent
Iwai et al.

(10) Patent No.: US 7,611,068 B2
(45) Date of Patent: Nov. 3, 2009

(54) TEMPERATURE ADJUSTMENT HANDLE AUTOROTATION PREVENTION DEVICE OF AUTOMATIC WATER MIXING VALVE

(75) Inventors: Shigeru Iwai, Kiyose (JP); Takeshi Hagiwara, Kiyose (JP)

(73) Assignee: Nippon Thermostat Co., Ltd., Tokyo (JP)

( * ) Notice: Subject to any disclaimer, the term of this patent is extended or adjusted under 35 U.S.C. 154(b) by 483 days.

(21) Appl. No.: 11/485,377

(22) Filed: Jul. 13, 2006

(65) Prior Publication Data

US 2007/0012792 A1    Jan. 18, 2007

(30) Foreign Application Priority Data

Jul. 14, 2005    (JP)    ............................. 2005-205617

(51) Int. Cl.
*G05D 23/185*    (2006.01)

(52) U.S. Cl. ................ 236/12.1; 236/12.23; 236/12.11; 236/12; 236/12.13; 236/12.14; 137/88; 137/457; 137/468

(58) Field of Classification Search ............. 231/12.11; 236/12.23, 12.11, 12, 12.13, 12.14; 137/88, 137/457, 468

See application file for complete search history.

(56) References Cited

U.S. PATENT DOCUMENTS

| | | | | |
|---|---|---|---|---|
| 7,204,785 | B2 * | 4/2007 | Berger et al. | .................. 477/94 |
| 2001/0007336 | A1 * | 7/2001 | Jelloul et al. | ............. 236/12.11 |
| 2008/0296122 | A1 * | 12/2008 | Michel | ..................... 192/13 R |

FOREIGN PATENT DOCUMENTS

| | | |
|---|---|---|
| JP | 58-40060 B | 9/1983 |
| JP | 3422439 B | 4/2003 |

\* cited by examiner

*Primary Examiner*—Cheryl J Tyler
*Assistant Examiner*—Michael Carton
(74) *Attorney, Agent, or Firm*—Smith Patent Office (57) ABSTRACT

A device is provided to prevent the autorotation of the temperature adjustment handle in an automatic hot and cold water mixing valve. A member is prevented from moving in the circumferential direction of the body and is pressed in the radial direction by a spring against the periphery of an adjusting screw receiver, which forms the rotation shaft of the temperature adjustment handle incorporated in the body. Alternatively, the member is dressed against a connecting sleeve connected to the adjusting screw receiver and the temperature adjustment handle. The member is pressed with sufficient force to oppose autorotation in the temperature adjusting handle when the temperature is set.

3 Claims, 8 Drawing Sheets

TEMPERATURE ADJUSTMENT HANDLE AUTOROTATION PREVENTION DEVICE OF AUTOMATIC WATER MIXING VALVE

BACKGROUND OF THE INVENTION

1. Field of the Invention

The present invention relates to a hot and cold water mixing valve that mixes hot and cold water and discharges mixed water at a specific temperature, of the type in which mixed water of the desired temperature is automatically controlled and discharged by a control mechanism that is controlled by a bias spring and thermo-element or SMA spring incorporated within the body, and the setting temperature is changed and adjusted by a temperature adjustment handle provided at one end of the body, and more particularly to an improved temperature adjustment handle autorotation prevention device in which the temperature adjustment handle provided at one end of the body for changing and adjusting the setting temperature is prevented by the reaction of a spring from autorotation that would disturb the setting temperature.

2. Description of the Related Art

Figure 1:
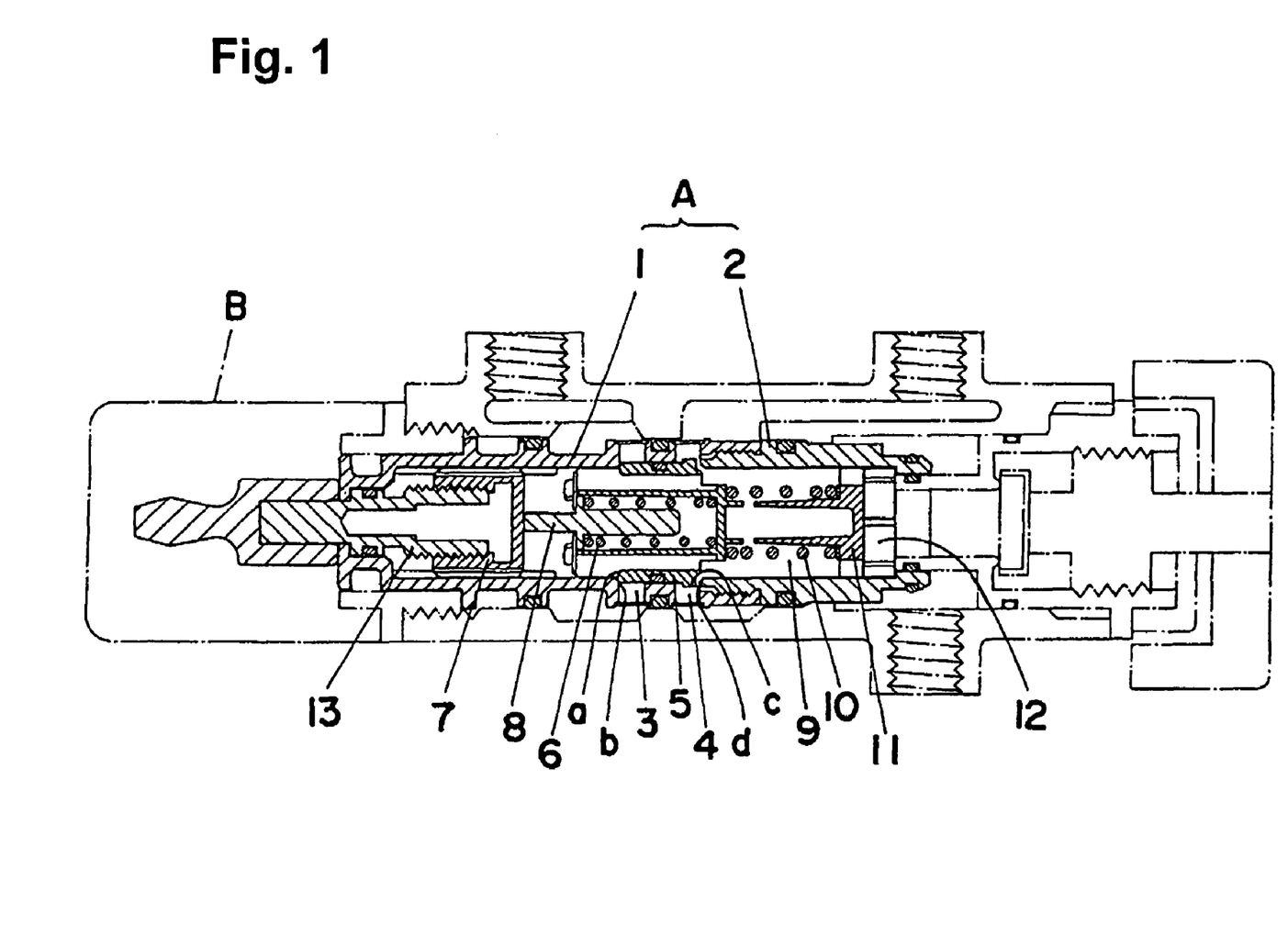
FIG. 1 is a section through a conventional automatic hot and cold water mixing valve.

As shown in FIG. 1, an automatic hot and cold water mixing valve in which the setting temperature of the discharged water is changed and adjusted by rotation of a temperature adjustment handle provided at one end of the body normally includes a body A formed in a cylindrical shape, including a case 1 formed in a cylindrical shape open at one end (the right end in the figure), and a cylindrical shaped valve seat 2 connected to the open end of the case 1, provided with a hot water inlet 3 and a cold water inlet 4 in the cylindrical wall, a cylindrical shaped control valve body 5 that controls the rate of flow of hot water flowing in from a hot water inlet 3 and the cold water flowing in from a cold water inlet 4 is inserted within the body A so that the control valve body 5 can move in the axial direction (the horizontal direction in FIG. 1), a first end of the control valve body 5 (the left hand side on the drawing) is in contact with and coupled to a first end of a bias spring 6, and a second end of the bias spring 6 is supported by a shaft 8 supported by an adjusting screw 7 that is capable of moving in the axial direction but is restricted from rotating by spline grooves in the body A. A first end (left hand side in the drawing) of a temperature sensitive spring 10 positioned within a mixing chamber 9 formed in an internal cavity of the cylindrical shaped valve seat 2 forming one end of the body A is in contact and coupled with a second end of the control valve body 5, a second end of the temperature sensitive spring 10 is supported by a spring seat 11 formed integrally and continuously with the internal cavity of the cylindrical shaped valve seat 2, and in this way the control valve body 5 is maintained in the position of equilibrium between the two springs, the bias spring 6 and the temperature sensitive spring 10. The rate of inflow of hot water and the rate of inflow of cold water are controlled to their respective rates in accordance with the intervals set between a hot water valve a at the first end of the control valve body 5 and a hot water valve seat b in confrontation thereto, and the interval between a cold water valve c at the second end of the control valve body 5 and a cold water valve seat d in confrontation thereto, when the control valve body 5 is set in the balanced stable position, and the hot and cold water is transmitted to the mixing chamber 9 in the mixing proportions in this way, and mixed water at a fixed temperature is discharged from a mixed water outlet 12 formed in an end of the cylindrical shaped valve seat 2.

In this way, when the inflow of cold water reduces due to a reduction in water pressure, the temperature of the mixed water in the mixing chamber 9 rises accordingly, the load in the temperature sensitive spring 10 positioned in the mixing chamber 9 increases due to the temperature sensitivity effect, and pushes against and compresses the bias spring 6, the control valve body 5 is pushed and the gap between the hot water valve a and the hot water valve seat b narrows, and the inflow of hot water reduces, also when the inflow of cold water increases due to an increase in water pressure or similar, the temperature of the mixed water reduces, the load in the temperature sensitive spring 10 reduces due to the temperature sensitivity effect, the bias spring 6 extends, the gap between the cold water valve c and the cold water valve seat d narrows, the inflow of cold water reduces, and in this way the temperature of the mixed water that had reduced rises. The control valve body 5 becomes stabilized at a position where the mixing ratio of hot and cold water and the temperature of the mixed water are balanced, so the configuration automatically controls the temperature of the mixed water to a constant setting temperature.

The setting temperature set by the position of equilibrium between the two springs is changed and adjusted to the desired temperature by the rotational operation of a temperature adjustment handle B provided on a first end of the body A, which rotates an adjusting screw receiver 13 incorporated in a cavity at the first end of the body A, which moves the adjusting screw 7 coupled to the adjusting screw receiver 13 in the axial direction (the horizontal direction in the drawing), which moves the shaft 8 supported by the adjusting screw 7 in the axial direction, which changes the position of support of the second end of the bias spring 6, which alters the position of equilibrium of the two springs.

However, automatic hot and cold water mixing valves configured in this way have the problem that, for example, when high temperature mixed water is required the temperature adjustment handle B is rotated in the high temperature direction to the position of the scale of the required temperature, the temperature sensitive spring 10 and the bias spring 6 which are in balance are compressed, and the reaction of the resultant force in the springs act on the adjusting spring 7, which acts on the temperature adjustment handle B, and the result is autorotation of the temperature adjustment handle B towards the low temperature side, which affects the setting temperature.

On the other hand, when low temperature mixed water is required, there is the problem that the temperature adjustment handle B is rotated in the low temperature direction, at this time a pull up spring provided to maintain contact between the shaft 8 and the adjusting screw 7 contracts, and autorotation of the temperature adjustment handle B in the opposite direction occurs to the high temperature side due to the reaction of the pull up spring, which affects the temperature setting.

Therefore in this automatic hot and cold water mixing valve it is necessary to ensure that when rotating the temperature adjustment handle to set the temperature of the mixed water, autorotation of the rotated temperature adjustment handle does not occur due to the reaction of the springs.

Figure 2:
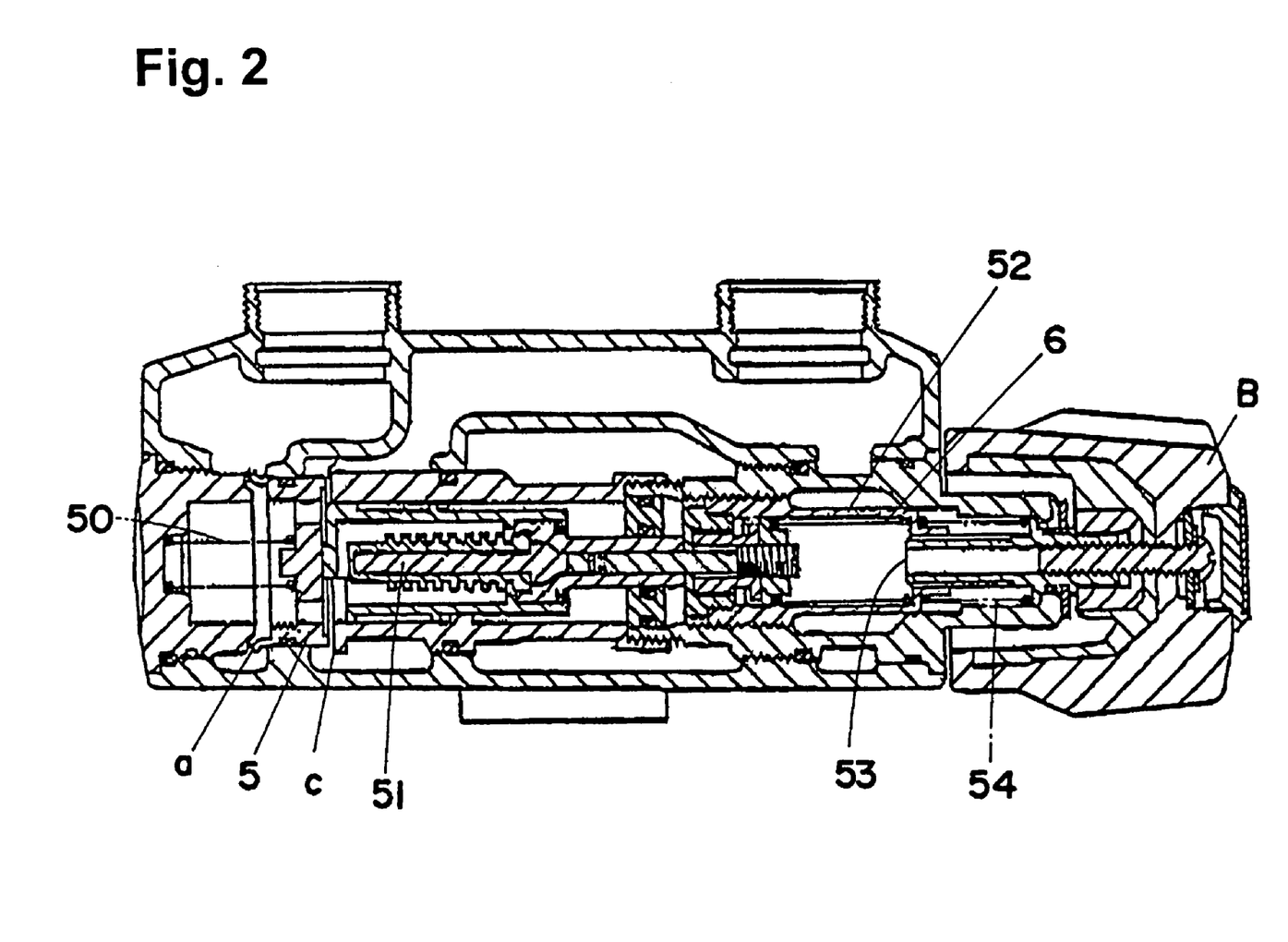
FIG. 2 is a section through another conventional automatic hot and cold water mixing valve.

FIG. 2 shows means that has been used to prevent autorotation in the temperature adjustment handle B. This is technology disclosed in Japanese Patent Application Laid-open No. 58-040060, as shown in FIG. 2, in a thermo-element mixing valve, an actuation spring 50 acts on a control valve body 5 via a temperature detecting element 51 whose stem moves in and out as a result of temperature variations, an actuating shaft 52 that supports a bias spring 6 is screwed to a spindle shaft 53 coupled to a temperature adjustment handle B, as a result of the operation of rotating the temperature adjustment handle B hot water that flows in from a hot water inlet past a hot water valve seat a and cold water that flows in from a cold water inlet past a cold water valve seat c are mixed, and the mixed water is discharged, the means being when the temperature adjustment handle B is rotated, a reaction force from the bias spring 6 acts on the actuation shaft 52, and a reaction force in the opposite direction from a coil spring w also acts on the actuation shaft 52, so that the reaction forces cancel, and autorotation of the temperature adjustment handle B does not occur.

Figure 3:
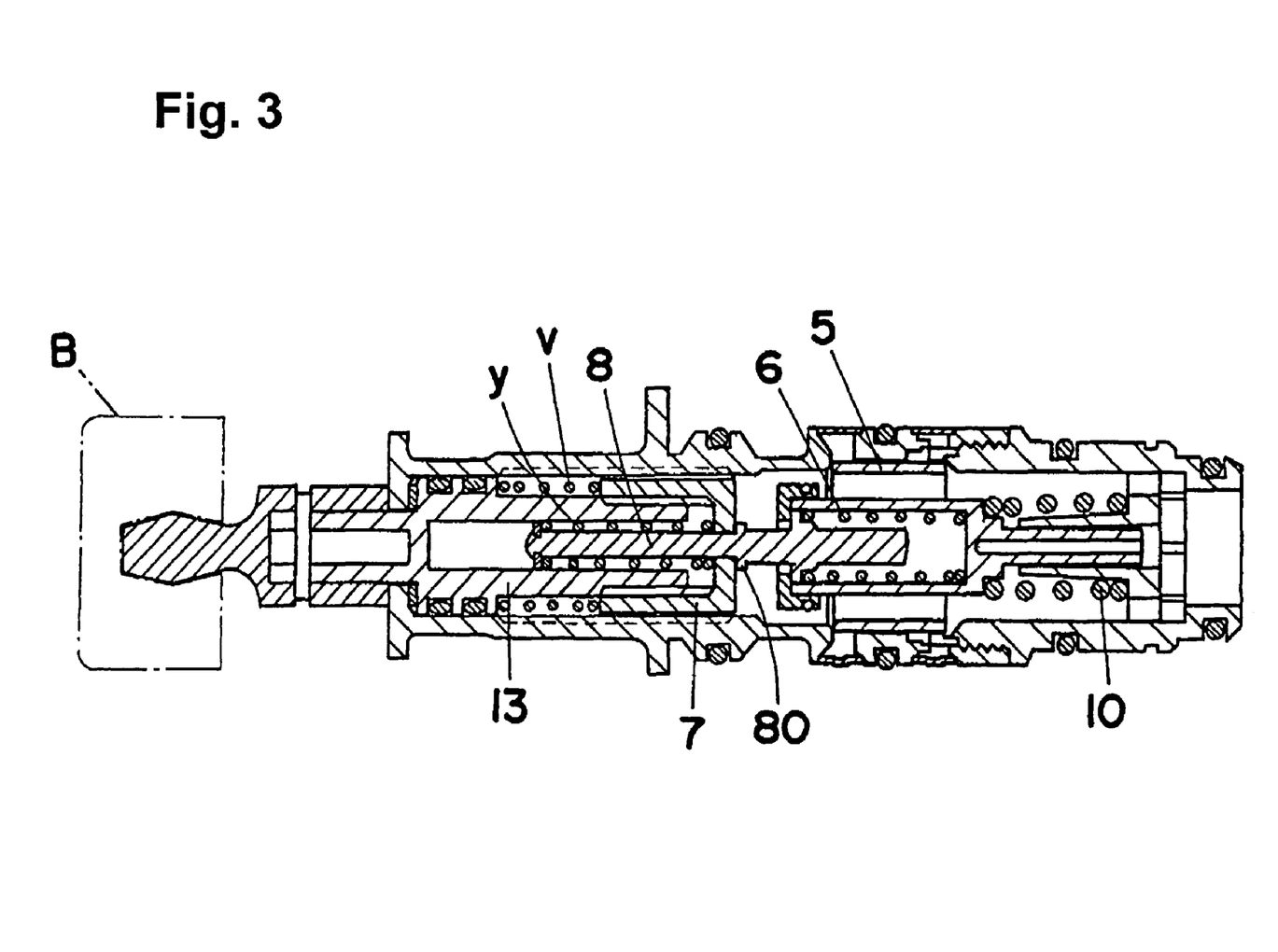
FIG. 3 is a section through yet another conventional automatic hot and cold water mixing valve.

Next, as shown in FIG. 3, in an automatic hot and cold water mixing valve in which a temperature sensitive spring (SMA spring) 10 and a bias spring 6 are coupled to a control valve body 5, a shaft 8 that supports one end of the bias spring 6 is inserted so that the shaft 8 can freely slide in an adjusting screw 7, the shaft 8 is coupled to the adjusting screw 7 by an engaging collar 80 provided on the shaft 8, and a pull up spring y is provided on the tip of the projection of the part of shaft 8 that penetrates the adjusting screw 7, the means being when a temperature adjustment dial B is rotated to the low temperature side, an adjusting screw receiver 13 coupled to the temperature adjustment dial B rotates, and when the adjusting screw 7 screwed to the adjusting screw receiver 13 is raised up, in order to cancel the reverse reaction of the pull up spring y that is shortened by this movement, an autorotation prevention spring v is provided as a coil spring coaxial with the pull up spring y between the adjusting screw receiver 13 and the adjusting screw 7, that is compressed and acts to press the adjusting screw 7 downwards when the adjusting screw 7 rises up.

Therefore in automatic hot and cold water mixing valves in which a temperature adjustment handle is rotated to set the temperature of the mixed water to the desired temperature, when rotation of the temperature adjustment handle to set the temperature is completed, autorotation of the temperature adjustment handle occurs which rotates the temperature adjustment handle which disturbs the temperature setting, so it is necessary to prevent this autorotation, and for this purpose a coil spring is included whose axial direction is the same as the direction of movement of a temperature sensitive actuator to cancel out the force that causes autorotation of the temperature adjustment handle, and this results in the problems that the length of the body in the axial direction is increased, and size reduction becomes difficult.

SUMMARY OF THE INVENTION

In an automatic hot and cold water mixing valve, when the temperature adjustment handle is rotated to the position of the desired temperature scale to set the temperature, a reaction force is generated in the bias spring and the temperature sensitive spring that tends to rotate the temperature adjustment handle, and to prevent rotation of the temperature adjustment handle in the opposite direction to the direction that the temperature adjustment handle was adjusted an autorotation prevention mechanism is incorporated in the automatic hot and cold water mixing valve so that the temperature adjustment handle will not move from the position of the temperature setting, so the problem to be solved by the present invention is that the autorotation prevention mechanism increases the length of the body in the axial direction and prevents size reduction of the automatic hot and cold water mixing valve, and the problem is to be solved in such a way that the desired temperature set by rotating the temperature adjustment handle will be maintained regardless of the setting temperature.

The reason that an autorotation prevention mechanism/ means that prevents autorotation of the temperature adjustment handle in the opposite direction when the temperature adjustment handle (temperature adjustment dial) of an automatic hot and cold water mixing valve is rotated to the position of the desired temperature scale prevents size reduction of an automatic hot and cold water mixing valve is in order to prevent autorotation of the temperature adjustment handle, the reactions of the bias spring, temperature sensitive spring, and other springs that cause autorotation of the temperature adjustment handle are cancelled by including a coaxial coil spring.

Therefore in the present invention, unlike conventional means, it was conceived that autorotation could be prevented if restraint with sufficient force to oppose the force causing rotation due to the reaction of the springs that cause autorotation of the temperature adjustment handle, and therefore it was conceived that by applying restraint to the rotation axis of the temperature adjustment handle by the spring pressure of a spring acting in a direction at right angles to the line of the axis of rotation of the temperature adjustment handle, the configuration of an autorotation prevention mechanism would be obtained that would allow reduction in size, next a temperature adjustment handle autorotation prevention device for an automatic hot and cold water mixing valve was proposed in which a restraint member is provided so that it is pressed by a spring in the radial direction onto the peripheral surface of an adjustment screw receiver that forms the rotation shaft of the temperature adjustment handle fitted to the body or a connecting sleeve that connects the adjusting screw receiver and the temperature adjustment handle to prevent movement in the circumferential direction relative to the body, so that by applying sufficient force to oppose the force tending to cause autorotation in the temperature adjustment handle, autorotation would be prevented.

Also in addition, means are proposed in which mating projections in the shape of the teeth of a gear are formed continuously in the circumferential direction on the peripheral surface of the connecting sleeve connecting the adjusting screw receiver and the temperature adjustment handle, and the restraint member that mates with the projections is held in a case fitted to the external surface of the body so that the restraint member can move forward and backward with respect to the peripheral surface of the sleeve, and the restraint member is pressed against the peripheral surface of the connecting sleeve, furthermore the restraint member is formed from a leaf spring and the spring itself presses against the peripheral surface of the sleeve or the adjusting handle receiver.

[Effects of the Invention]

The temperature adjustment handle autorotation prevention means for an automatic hot and cold water mixing valve according to the means of the present invention applies restraint with respect to the rotation direction of the temperature adjustment handle by the restraint member when the temperature adjustment handle is rotated to set the temperature of the discharged mixed water, so autorotation due to the reaction of the bias spring and the temperature sensitive spring is prevented, so autorotation is effectively prevented.

Also, a spring with spring pressure acting on the peripheral surface of the connecting sleeve or the adjusting screw receiver that forms the rotation shaft of the temperature adjustment handle in the radial direction at right angles to the axial direction is used, so autorotation can be prevented in a manner that allows reduction is size of the automatic hot and cold water mixing valve.

Also, when the restraint member is held in a case fitted to the external surface of the body of the automatic hot and cold water mixing valve, capable of moving forward and backward with respect to the peripheral surface of the connecting sleeve, and pressed by a spring to apply restraint, assembly is easy with respect to the automatic hot and cold water mixing valve, also change of components due to sliding resistance of the control valve body, the difference in force in bias spring, or required setting force is easy.

Furthermore, when the restraint member is a leaf spring, one end or the central part thereof directly presses against the mating projections in the shape of teeth of a gear provided on the peripheral surface of the connecting sleeve or the adjusting screw receiver, the restraint member and the spring that presses the restraint member to the mating projections are formed integrally, so the number of components is reduced which simplifies the structure, as well as prevents autorotation.

DESCRIPTION OF THE PREFERRED EMBODIMENTS

In the temperature adjustment handle autorotation prevention means for an automatic hot and cold water mixing valve according to the means of the present invention, a restraint member held so that the restraint member can move in the radial direction of the body is pressed by spring pressure against the peripheral surface of the connecting sleeve that forms the axis of rotation of the temperature adjustment handle and connects the temperature adjustment handle and the adjusting screw receiver, or the adjusting screw receiver, and applies restraint to the force in the rotation direction due to the reaction of the bias spring and the temperature sensitive spring caused by rotation of the temperature adjustment handle to set the temperature.

Embodiment 1

Figure 4:
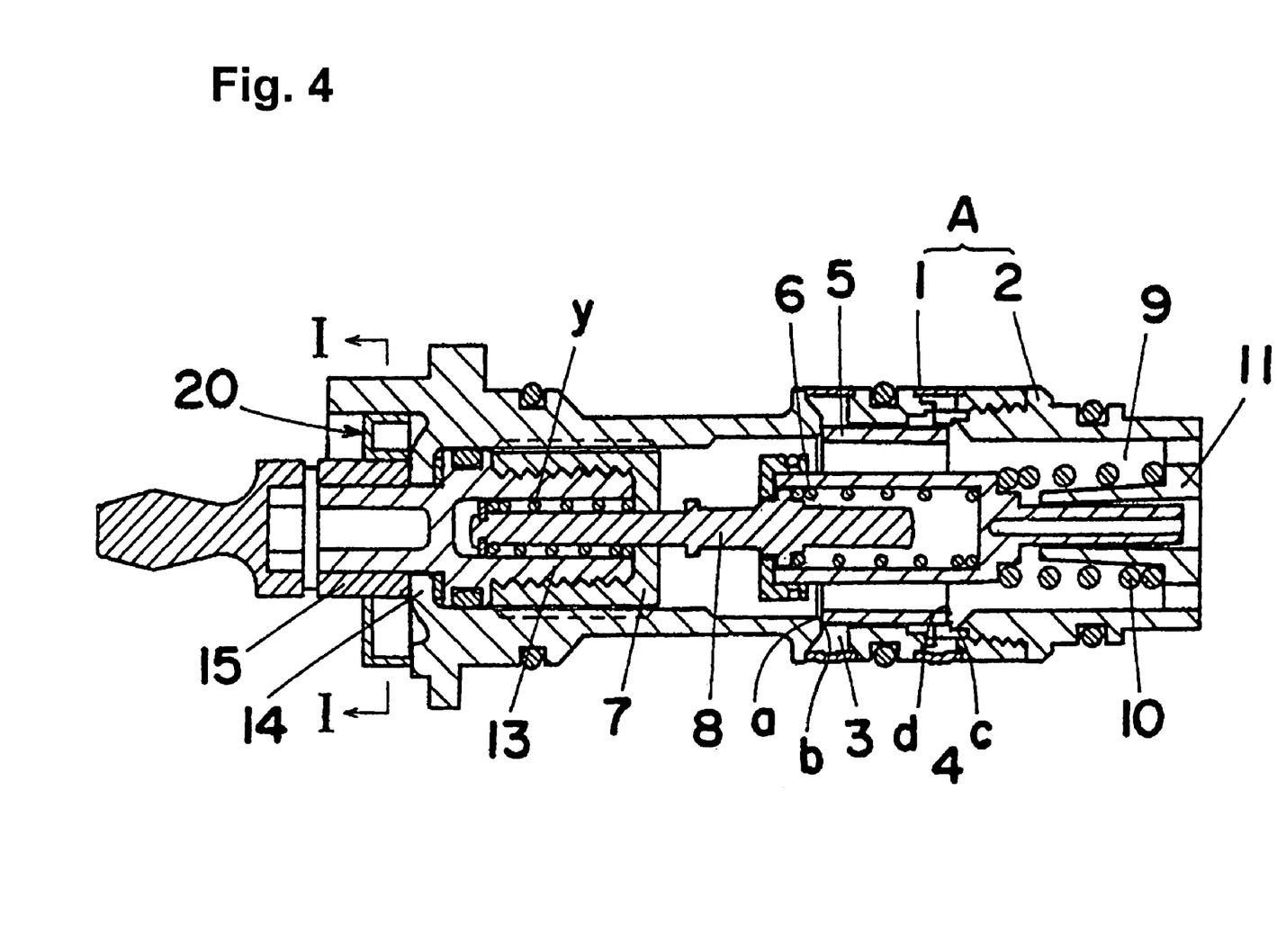
FIG. 4 is a section through the body of an automatic hot and cold water mixing valve according to the means of the present invention.
Figure 5:
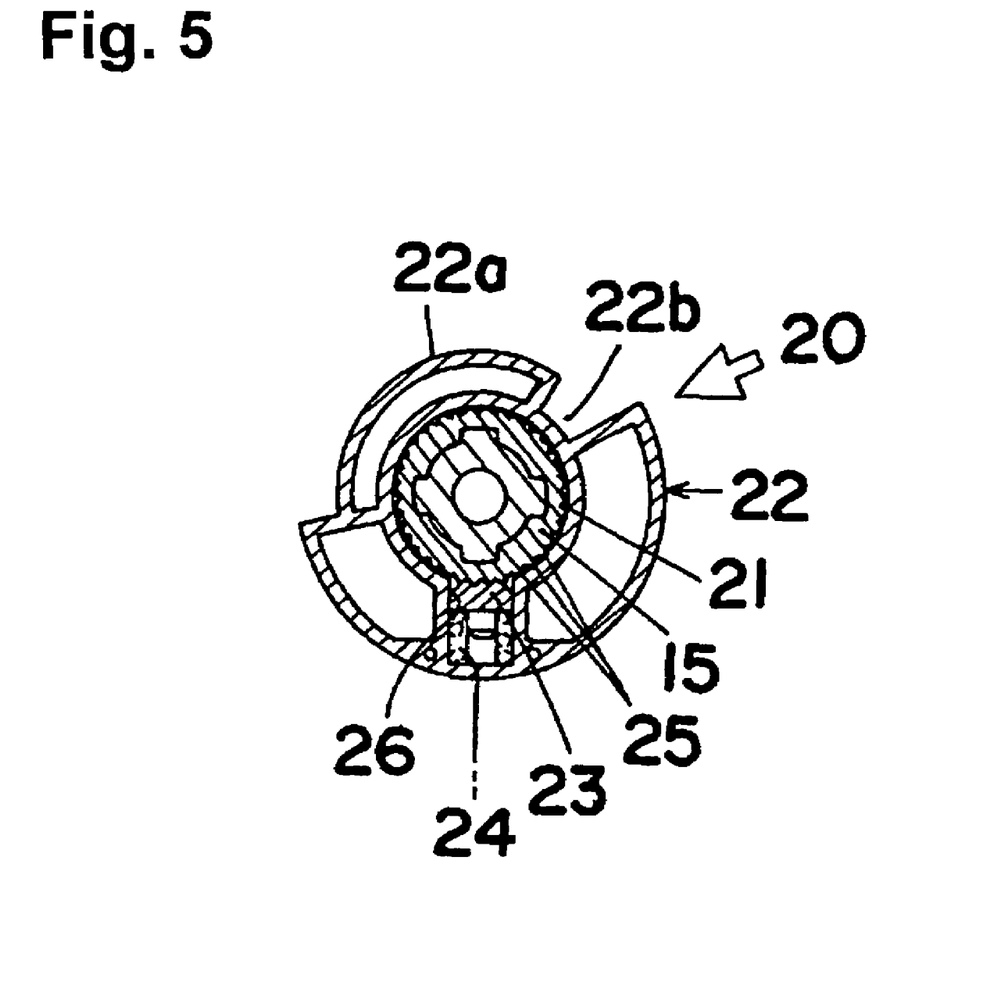
FIG. 5 is a cross section on the line I-I of FIG. 4.
Figure 6:
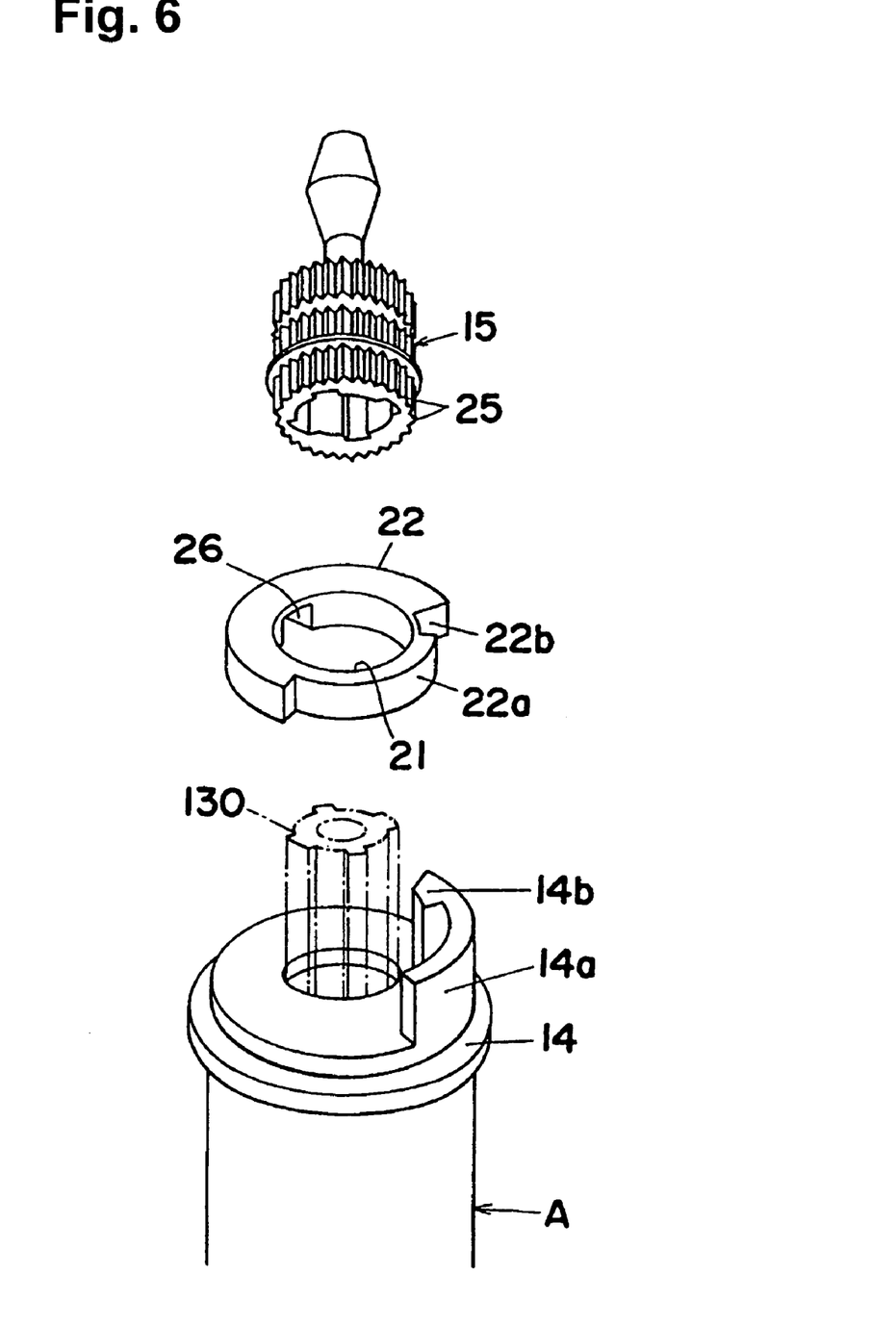
FIG. 6 is an isometric exploded view of the main parts of the above.

Next an example of an embodiment will be explained in detail together with the drawings. FIG. 4 is a longitudinal section through a body A of an automatic hot and cold water mixing valve according to the present invention, FIG. 5 is Section I-I in FIG. 4, and FIG. 6 is an isometric view of the main parts of the above.

In the figure, A is a body that includes a case 1 formed in a cylindrical shape with a bottom, and a cylindrical shaped valve seat 2 connected to an open end of the case 1, a hot water inlet 3 and a cold water inlet 4 are provided in the peripheral wall of the body A, and a mixing chamber 9 is formed in a cavity of the cylindrical shaped valve seat 2.

A control valve body 5 formed in a cylindrical shape is fitted within a cavity in the body A at the inside of the hot water inlet 3 and the cold water inlet 4, so that the control valve body 5 can slide freely in the axial direction, at a first end of the control valve body 5 a hot water valve a is formed in confrontation with a hot water valve seat b formed in the hot water inlet 3, and at a second end of the control valve body 5 a cold water valve d is formed in confrontation with a cold water valve seat c formed in the cold water inlet 4. One end of the core of the control valve body 5 is in contact with a first end of a temperature sensitive spring 10 made from a SMA spring, and another end is in contact with a first end of a bias spring 6.

A second end of the temperature sensitive spring 10 is supported by a spring seat 11 incorporated in the internal cavity of the valve seat 2, also a second end of the bias spring 6 is supported by a shaft 8, the shaft 8 passes through and can freely slide in a hole provided in the bottom wall of a cylindrical shaped adjusting screw 7 that has a bottom and is fitted via splines so that it can freely slide in the axial direction only within the body A, an engaging collar provided on the shaft 8 engages with the bottom surface of the adjustment screw 7, an internal peripheral surface of the adjusting screw 7 is provided with a female screw thread which is screwed to a male screw thread provided on an external peripheral surface of an adjusting screw receiver 13 incorporated on the second side of the cavity of the Body A, so that the control valve body 5 is maintained in the position of equilibrium of the temperature sensitive spring 10 and the bias spring 6.

A connecting sleeve 15 is fitted to a projecting end of the adjusting screw receiver 13 that projects through a central hole provided in a partition wall 14 at an end of the body A, and by moving the adjusting screw 7 in the axial direction by the rotary movement of a temperature adjustment handle B fitted to the connecting sleeve 15, the position of equilibrium of the control valve body 5 is changed and adjusted as desired.

A pull up spring y is provided between the tip of the projection, which passes through the through hole in the bottom wall of the adjusting screw 7, of the shaft 8 which supports the bias spring 6, and the bottom wall of the adjusting screw 7, which acts to pull up the shaft 8.

An autorotation prevention device 20 is included in the automatic hot and cold water mixing valve configured in this way to prevent autorotation in the opposite direction when the temperature adjustment handle B is rotated to the position of the required temperature scale in order to set the temperature, on the outside surface of the partition wall 14 at an end of the body A, this example includes a nipple shaped connecting sleeve 15 fitted and integrally connected to a connecting shaft of the adjusting screw receiver 13 projecting from the partition wall 14, a ring shaped case 22 fitted so that a central hole 21 mates with the periphery of the connecting sleeve 15, a restraint member 23 incorporated on the case 22 so that it can move forward and backward relative to the central hole 21, a coil shaped spring 24 incorporated on the case 22 so that it presses the restraint member 23 towards the central hole 21, and a plurality of projections 25 in the shape of the teeth of a gear provided continuously in the circumferential direction on the outer periphery of the nipple shaped connecting sleeve 15.

As shown in FIG. 6, the case 22 is formed as an irregularly shaped ring, with a reduced diameter part 22a and a mating cut-out 22b on the external periphery, a notch 26 is formed in the surface of the wall of the central hole 21 that mates with the peripheral surface of the nipple shaped connecting sleeve 15 so that part of the peripheral surface of the mating connecting sleeve 15 is exposed with respect to the internal cavity of the case 22, and the tip of the restraint member 23 referred to above projects from the notch 26 towards the central hole 21.

As shown in FIG. 6, the partition wall 14 of the body A includes a mating wall 14a that mates with the external surface of the reduced diameter part 22a of the case 22, and a mating projection 14b that is inserted in the mating cut-out 22b of the case 22, and as a result of these parts mating the case 22 is maintained in the position shown in FIG. 4 relative to the body A.

In this way, when the temperature adjustment handle B fitted on the nipple shaped connecting sleeve 15 is rotated to set the desired temperature of the discharged mixed water, the tip of the restraint member 23 assembled into the case 22 is pressed against the continuous gear tooth shaped mating projections 25 provided on the peripheral surface of the connecting sleeve 15 that forms the rotation axis of the temperature adjustment handle B, so when the temperature adjustment handle B is rotated in either the clockwise or counterclockwise direction a load is applied to the restraint member 23 whose tip is mating with the mating projections 25 to cause an elastic deformation so that the restraint member 23 is ejected from the valleys of the mating projections 25 and pass over the mating projections 25, the restraint member 23 successively passes over the mating projections 25 that are aligned in the circumferential direction, and the restraining action of the restraint member 23 prevents autorotation within the range of force required to cause elastic deformation to pass over the mating projections 25.

Embodiment 2

Figure 7:
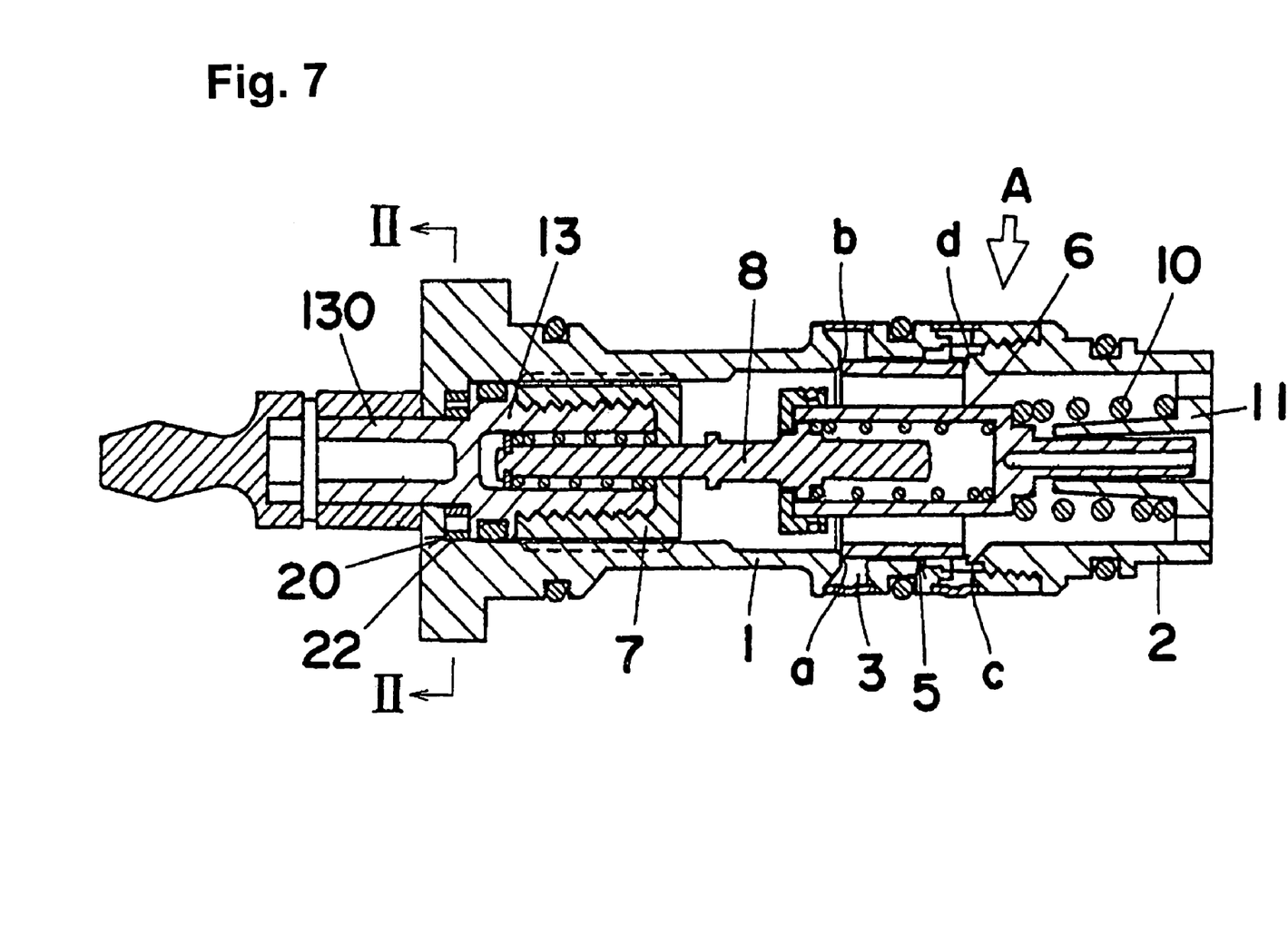
FIG. 7 is a cross section view of another example of embodiment.
Figure 8:
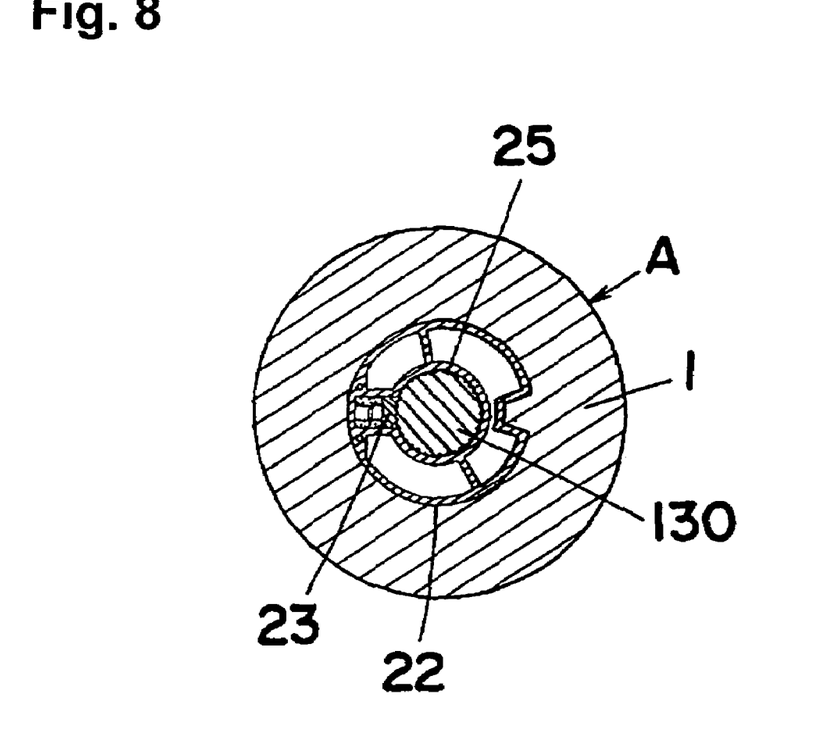
FIG. 8 is a cross section view on the line II-II in the above example of embodiment.

Next, FIGS. 7 and 8 show another embodiment. In this example the case 22 that houses the restraint member 23 in the previous embodiment is provided in a position within the body A at one end of the automatic hot and cold water mixing valve between the partition wall 14 and the shoulder of the adjusting screw receiver 13, the tip of the restraint member 23 housed within the case 22 acts on the peripheral surface of a connecting shaft 130 of the adjusting screw receiver 13 that mates with the connecting sleeve 15.

In this example, continuous mating projections 25 in the shape of the teeth of a gear are formed in the circumferential direction of the peripheral surface of the rear part of the connecting shaft 130 of the adjusting screw receiver 13 that is mating with the connecting sleeve 15, the restraint member 23 housed in the case 22 located at the lower part of the partition wall 14 within the body A prevents autorotation of the temperature adjusting handle B by mating with the mating projections 25.

Embodiment 3

Figure 9:
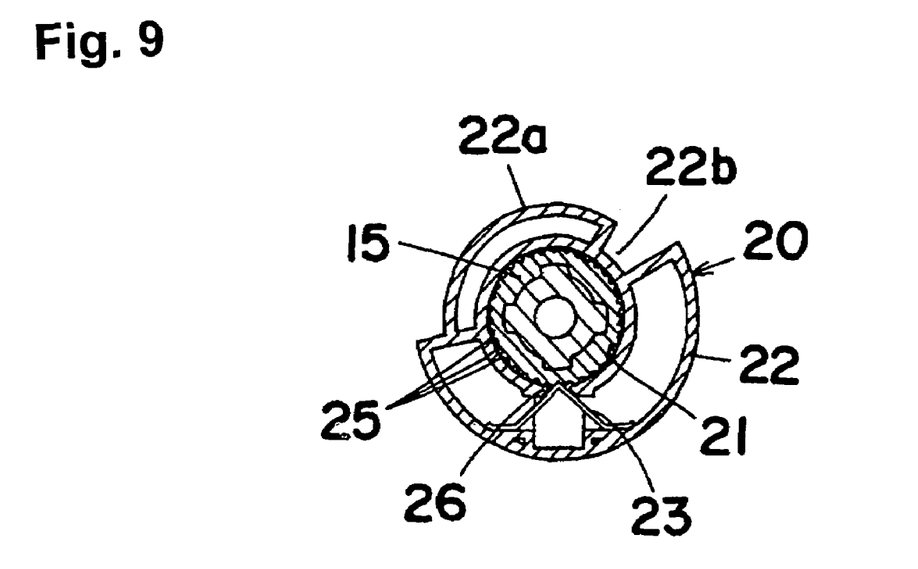
FIG. 9 is a cross section view of yet another example of embodiment.

Next, FIG. 9 shows yet another embodiment. This example is an embodiment in which the configuration of the restraint member 23 that prevents autorotation of the temperature adjustment handle B described in the above embodiments is modified.

In this example, the restraint member 23 prevents motion in the rotational direction of the nipple shaped connecting sleeve 15 or the adjusting screw receiver 13 that forms the rotational shaft of the temperature adjustment handle B, the restraint member 23 is a bent leaf spring, and the bent leaf spring itself is pressed against and mates with mating projections 25 in the shape of the teeth of a gear provided on the periphery of the connecting shaft 130, in this example the coil shaped spring 24 of the previous examples is integral with the restraint member 23 so the number of components is reduced, regarding how the restraint member 23 is pressed against the mating projections 25 in the shape of teeth of a gear positioned within the central hole 21 of the case 22 held with respect to the body A, via a notch 26 provided in the wall surface of the central hole 21 of the case 22, there is no change from the autorotation prevention mechanism included in embodiment 1.

In each of the above embodiments, examples have been shown in which the control element 23 is pressed by spring pressure against a plurality of mating projections in the shape of the teeth of a gear provided on the periphery of the adjusting screw receiver 13 or the connecting sleeve 15 connected to the adjusting screw receiver 13, and elastically mates with the surface of the adjusting screw receiver 13 or the connecting sleeve 15 only, however, the embodiments are not limited to the embodiments shown, for example, instead of continuous mating projections in the shape of the teeth of a gear 25, a frictional surface in the form of a rough surface can be provided on the peripheral surface of the adjusting screw receiver 13 or the connecting sleeve 15, and the restraint member 23 can be formed with a brake shoe shape and fixed with respect to the direction of rotation of the adjusting screw receiver 13 or the connecting sleeve 15 and held by the body A so that the restraint member 23 can move forward and backward with respect to the peripheral surface and pressed against the peripheral surface by a predetermined spring pressure, and in this way a restraining force is provided against autorotation of the temperature adjustment handle B caused by spring reactions, the configuration is arbitrary and may be configured as appropriate.

What is claimed is:

1. A temperature adjustment handle autorotation prevention device for an automatic hot and cold water mixing valve, the automatic hot and cold water mixing valve comprising:
    a body comprising a cylindrical shaped case having a bottom and a cylindrical shaped valve seat connected to an open end of the cylindrical shaped case, wherein a hot water inlet and a cold water inlet are provided in the cylindrical shaped case of the body;
    a cylindrical shaped control valve body fitted within the body so as to be able to move in an axial direction;
    a temperature sensitive spring whose first end is coupled to a first end of the control valve body in the axial direction thereof;
    a bias spring whose first end is coupled to a second end of the control valve body in the axial direction thereof;
    an adjusting screw that supports a proximal end of the bias spring; and
    a temperature adjustment handle provided at an end of the body,
    wherein the control valve body is held in a position determined by an equilibrium of the temperature sensitive spring and the bias spring, and
    the adjustment screw is displaced in the axial direction by rotation of the temperature adjustment handle to set a desired temperature setting,
    wherein a restraint member, that is prevented from moving in a circumferential direction of the body and that is pressed by a spring in a radial direction against a periphery of an adjusting screw receiver forming a rotation shaft of the temperature adjustment handle incorporated in the body or a connecting sleeve connected to the adjusting screw receiver and the temperature adjusting handle, with sufficient force to oppose the force in the rotational direction causing autorotation in the temperature adjustment handle when the temperature is set, so as to prevent autorotation of the temperature adjustment handle, wherein a plurality of mating projections are formed continuously in the circumferential direction on the peripheral surface of the adjusting screw receiver that is connected to the temperature adjustment handle via the connecting sleeve, the mating projections having a shape substantially similar to teeth of a gear; the restraint member, which is pressed against the plurality of mating projections on the periphery of the adjusting screw receiver, is held in a case incorporated in an internal cavity of the body, the restraint member being freely movable in a forward and backward direction with respect to the peripheral surface of the adjusting screw receiver, and said restraint member is urged to be pressed against the mating projections of the peripheral surface of the adjusting screw receiver by a spring.

2. The temperature adjustment handle autorotation prevention device for an automatic hot and cold water mixing valve according to claim 1, wherein the restraint member is formed of a leaf spring, and the leaf spring presses against the mating projections provided in the peripheral surface of the adjusting screw receiver.

3. A temperature adjustment handle autorotation prevention device for an automatic hot and cold water mixing valve, the automatic hot and cold water mixing valve comprising:

a body comprising a cylindrical shaped case having a bottom and a cylindrical shaped valve seat connected to an open end of the cylindrical shaped case, wherein a hot water inlet and a cold water inlet are provided in the cylindrical shaped case of the body;

a cylindrical shaped control valve body fitted within the body so as to be able to move in an axial direction;

a temperature sensitive spring whose first end is coupled to a first end of the control valve body in the axial direction thereof;

a bias spring whose first end is coupled to a second end of the control valve body in the axial direction thereof;

an adjusting screw that supports a proximal end of the bias spring; and a temperature adjustment handle provided at an end of the body, wherein the control valve body is held in a position determined by an equilibrium of the temperature sensitive spring and the bias spring, and the adjustment screw is displaced in the axial direction by rotation of the temperature adjustment handle to set a desired temperature setting, wherein a restraint member, that is prevented from moving in a circumferential direction of the body and that is pressed by a spring in a radial direction against a periphery of an adjusting screw receiver forming a rotation shaft of the temperature adjustment handle incorporated in the body or a connecting sleeve connected to the adjusting screw receiver and the temperature adjusting handle, with sufficient force to oppose the force in the rotational direction causing autorotation in the temperature adjustment handle when the temperature is set, so as to prevent autorotation of the temperature adjustment handle, wherein a plurality of mating projections formed continuously in the circumferential direction on the peripheral surface of the connecting sleeve connecting the temperature adjustment handle and the adjustment screw receiver, the mating projections having a shape substantially similar to teeth of a gear; the restraint member, which is pressed against the peripheral surface of the connecting sleeve, is held in a case incorporated to the outside surface of the body, the restraint member freely movable in a forward and backward direction with respect to the peripheral surface of the adjusting screw receiver, and said restraint member is urged to be pressed against the peripheral surface of the connecting sleeve by a spring, and the restraint member includes a leaf spring, and the leaf spring presses against the mating projections provided in the peripheral surface of the connecting sleeve.

* * * * *